United States Patent Office 3,649,634
Patented Mar. 14, 1972

3,649,634
4-ALKOXY-2,3-DIHYDRO-1H-PYRROLO[2.3-b] QUINOLINE COMPOUNDS
Hajime Fujimura, Kyoto-shi, Kyoto-fu, Tadasu Tanaka, Oomiya-shi, Mitsuyoshi Wagatsuma, Hatogaya-shi, Takeo Twakuma, Oomiya-shi, and Michihiko Miyazaki, Kawaguchi-shi, Japan, assignors to Tanabe Seiyaku Co., Ltd., Osaka, Japan
No Drawing. Filed Jan. 23, 1969, Ser. No. 793,573
Claims priority, application Japan, Jan. 25, 1968, 43/4,515, 43/4,516
Int. Cl. C07d 57/04
U.S. Cl. 260—286 R                          6 Claims

ABSTRACT OF THE DISCLOSURE

4 - alkoxy - 2,3 - dihydro - 1H-pyrrolo[2,3-b]quinoline compounds represented by the formula:

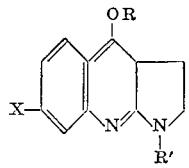

wherein R is a lower alkyl group, R' is a hydrogen atom or a benzyl group and X is a hydrogen atom, a halogen atom or a methoxy group and having remarkable anti-inflammatory activity, and a method for preparing the said compounds by etherifying the corresponding 4-hydroxyl compounds with diazo(lower)alkane or by reacting the corresponding 4-halo compounds with alkali metal lower alkoxide or a mixture of lower alkanol and alkali metal hydroxide.

---

This invention relates to novel 4-alkoxy-2,3-dihydro-1H-pyrrolo[2,3-b]quinoline compounds and their production.

The said 4 - alkoxy - 2,3-dihydro-1H-pyrrolo[2,3-b]-quinoline compounds are represented by the formula:

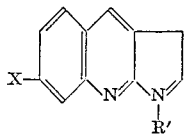

wherein R is a lower alkyl group (e.g. methyl, ethyl, propyl, isopropyl, butyl), R' is a hydrogen atom or a benzyl group and X is a hydrogen atom, a halogen atom (e.g. chlorine, bromine, iodine) or a methoxy group.

It has been found that the said 4-alkoxy-2,3-dihydro-1H-pyrrolo[2,3-b]quinoline compounds [I] and their acid-addition salts have remarkable anti-inflammatory activity. For example, with an oral dose of about 100 mg./kg., 4 - methoxy - 7 - chloro - 2,3-dihydro-1H-pyrrolo[2,3-b]quinoline hydrochloride decreases carrageenin-induced edema and formalin-induced edema in a hind leg of rats over 2 times more effectively than phenylbutazone does.

It has also been found that the compounds [I] and their acid-addition salts possess high analgesic activity. For example, the analgesic activity of 4-methoxy-7-chloro-2,3-dihydro-1H-pyrrolo[2,3-b]quinoline hydrochloride is more than 2 times that of phenylbutazone in the test using mice.

It has further been found that the compounds [I] are considerably less toxic. For instance, the acute toxicity of 4 - methoxy-7-chloro-2,3-dihydro-1H-pyrrolo[2,3-b] quinoline hydrochloride is $LD_{50} > 1000$ mg./kg. when orally administered to mice and that of phenylbutazone is $LD_{50} = 650$ mg./ kg.

For the practical use of the 4-alkoxy-2,3-dihydro-1H-pyrrolo[2,3-b]quinoline compounds [I] and their acid-addition salts as medicaments, they may be employed in the form of pharmaceutical preparations, which contain them in admixture with a pharmaceutical organic or inorganic carrier material suitable for enteral or parenteral applications. Oral administration by the use of tablets, capsules, powders or in liquid form such as suspensions, solutions, emulsions or syrups is particularly advantageous. When formed into tablets, conventional excipients (e.g. sodium citrate, lactose, microcrystalline cellulose, starch, etc.), lubricating agents (e.g. anhydrous silicic acid, hydrized castor oil, magnesium stearate, sodium lauryl sulfate, talc, etc.) and binding agents (e.g. starch paste, glucose, lactose, gum acacia, gelatin, mannitol, magnesium trisilicate, talc, etc.) can be used. When administered as liquids, conventional liquid carriers can be employed. In the case of solid preparations, each unit dosage form of the active ingredient can contain from about 5 to about 95% of the same by weight of the entire composition with the remainder comprising conventional pharmaceutical carriers. When the therapeutic agent is used as aqueous solution, i.e. injection, the solution may contain about 0.05 to about 0.5% of the same by weight of the entire solution.

According to the present invention, the desired 4-alkoxy - 2,3 - dihydro - 1H - pyrrolo[2,3-b]quinoline compound [I] is prepared by subjecting the corresponding 2,3 - dihydro - 1H - pyrrolo[2,3-b]quinoline compound represented by the formula:

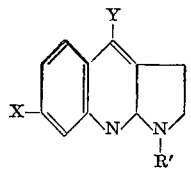

[II]

wherein R' and X are each as defined above and Y is a hydroxyl group or a halogen atom (e.g. chlorine, bromine) to the reaction to convert the group Y into a lower alkoxy group.

In an embodiment of the present invention, the starting compound [II] wherein Y is a hydroxyl group is reacted with diazo(lower)alkane (e.g. diazomethane, diazoethane) to convert the group Y into a lower alkoxy group by etherification. The reaction may be carried out by adding diazo(lower)alkane to a solution or suspension of the compound [II] in an organic solvent (e.g. ether, tetrahydrofuran, dioxane, methanol). Diazo(lower)-alkane is used favorably in a stoichiometrically excessive amount, especially in about 5 to about 10 mol to one mol of the compound [II]. It is convenient to use the diazo(lower)alkane in a form of solution which was prepared from N-lower alkyl-N-nitroso-p-toluenesulfon-amide in a conventional manner, for example, by treating with an alkali (e.g. potassium hydroxide, sodium hydroxide). Usually, the reaction takes place by allowing the mixture to stand at room temperature for about 16 to about 48 hours.

The starting compound [II: Y=hydroxyl] is novel and can be prepared by reacting a compound of the formula:

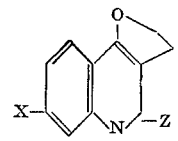

wherein X is as defined above and Z is a halogen atom (e.g. chlorine, bromine) with ammonia or an amine of the formula:

wherein R' is as defined above.

In another embodiment of the present invention, the starting compound [II] wherein Y is a halogen atom is reacted with alkali metal lower alkoxide (e.g. potassium methoxide, potassium ethoxide, sodium methoxide, sodium ethoxide) or a mixture of lower alkanol (e.g. methanol, ethanol, propanol) and alkali metal hydroxide (e.g. potassium hydroxide, sodium hydroxide) to convert the group Y into a lower alkoxy group by substitution. The reaction may be carried out by adding the compound [II] to a solution of alkali metal lower alkoxide in an organic solvent (e.g. methanol, ethanol, benzene, toluene, monoglyme (diethylene glycol monomethyl ether), diglyme (diethylene glycol dimethyl ether), dioxane) or by admixing the compound [II] with alkali metal hydroxide in anhydrous lower alkanol. It is preferable to use the alkali metal lower alkoxide in a stoichiometrically excessive amount, especially in about 2 mol to one mol of the compound [II]. The reaction is ordinarily accomplished at an elevated temperature, favorably under pressure for several to 10 hours.

The starting compound [II: Y=halogen] is also novel and can be prepared by reacting a compound of the formula:

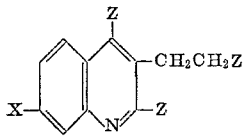

wherein X and Z are each as defined above with ammonia or an amine of the formula:

wherein R' is as defined above.

The thus prepared 4-alkoxy - 2,3-dihydro-1H-pyrrolo-[2,3-b]quinoline compound [I] may be converted into its acid-addition salt by treating the former with an acid such as hydrochloric acid, hydrobromic acid, sulfuric acid, nitric acid, perchloric acid, oxalic acid, citric acid, tartaric acid or succinic acid.

Practical and presently-preferred embodiments of the present invention are illustratively shown in the following examples.

EXAMPLE 1

Preparation of the starting compound

To a solution of 4-chloro-2,3-dihydrofuro[3,2-c]quinoline in toluene, 40% aqueous ammonia is added, and the mixture is heated at 140 to 150° C. in an autoclave for 10 hours. The resultant crystals are recrystallized from methanol whereby 4-hydroxy - 2,3 - dihydro - 1H - pyrrolo [2,3-b]quinoline is obtained as colorless crystals melting at 225 to 227° C. (decomp.).

Preparation of the objective compound

In 400 ml. of methanol, 6.5 g. of 4-hydroxy-2,3-dihydro-1H-pyrrolo[2,3-b]quinoline are dissolved. An ether solution of diazomethane prepared from 37 g. of N-methyl-N-nitroso-p-toluenesulfonamide and 11.2 g. of potassium hydroxide is added to the resultant solution. The mixture is allowed to stand at room temperature for 36 hours. Then, the mixture is evaporated to remove the remaining excessive part of diazomethane and solvents under reduced pressure, and the residue is washed with 2% aqueous solution of sodium hydroxide. The residue is recrystallized from methanol whereby 4.7 g. of 4-methoxy-2,3-dihydro-1H-pyrrolo[2,3-b]quinoline are obtained as colorless rhombic prisms melting at 217 to 219° C. Hydrochloride, M.P. 214 to 215° C. (decomp.) (recrystallized from ethanol).

EXAMPLE 2

Preparation of the starting compound

A solution of 4,7-dichloro-2,3-dihydrofuro[3,2-c]quinoline in a mixture of 28% aqueous ammonia, toluene and ethanol is heated at 140 to 150° C. in an autoclave for 7 hours. The resultant crystals are dissolved in dilute sodium hydroxide solution to remove undissolved impurities, and the solution is acidified with acetic acid to precipitate 4-hydroxy - 7 - chloro-2,3-dihydro-1H-pyrrolo [2,3-b]quinoline. Hydrochloride, M.P. 261 to 263° C. (decomp.).

Preparation of the objective compound

To a suspension of 2.7 g. of 4-hydroxy-7-chloro-2,3-dihydro-1H-pyrrolo[2,3-b]quinoline is 450 ml. of methanol, an ether solution of diazomethane prepared from 37 g. of N-methyl-N-nitroso-p-toluenesulfonamide as described in Example 1 is added, and the mixture is allowed to stand at room temperature for 48 hours. Then, the mixture is evaporated to remove the remaining excessive part of diazomethane and solvents under reduced pressure, and the residue is washed with 2% aqueous solution of sodium hydroxide. The residue is recrystallized from chloroform whereby 1.7 g. of 4-methoxy-7-chloro-2,3-dihydro-1H-pyrrolo[2,3-b]quinoline are obtained as colorless granules melting at 224 to 225° C. Hydrochloride, M.P. 203 to 204° C. (decomp.) (recrystallized from ethanol).

EXAMPLE 3

Preparation of the starting compound

A mixture of 4,7-dichloro-2,3-dihydrofuro[3,2-c]quinoline and benzylamine in xylene is heated at 160 to 180° C. for 15 hours. After cooling, ether is added to the mixture to precipitate 1-benzyl - 4 - hydroxy-7-chloro-2,3-dihydro - 1H - pyrrolo[2,3-b]quinoline. M.P. 260° C. (decomp.).

Preparation of the objective compound

To a suspension of 4.0 g. of 1-benzyl-4-hydroxy-7-chloro-2,3-dihydro-1H-pyrrolo[2,3-b]quinoline in a mixture of 100 ml. of methanol and 400 ml. of ether, an ether solution containing a stoichiometrically 5 times larger amount of diazomethane is added, and the mixture is allowed to stand at room temperature for 48 hours. Then, the mixture is evaporated to remove the excessive part of diazomethane and solvents under reduced pressure, and the residue is recrystallized from methanol to give 3.3 g. of 1-benzyl-4-methoxy-7-chloro-2,3-dihydro-1H-pyrrolo[2,3-b]quinoline as colorless scales melting at 122 to 124° C. Hydrochloride, M.P. 206 to 208° C. (decomp.) (recrystallized from methanol).

EXAMPLE 4

Preparation of the starting compound

A mixture of 4-chloro-7-methoxy-2,3-dihydrofuro-[3,2-c]quinoline and benzylamine in xylene is heated at 165° C. for 16 hours. After cooling, ether is added to the mixture to precipitate 1-benzyl-4-hydroxy-7-methoxy-2,3-dihydro - 1H - pyrrolo[2,3 - b]quinoline. M.P. 286° C. (decomp.).

Preparation of the objective compound

To a suspension of 5.0 g. of 1-benzyl-4-hydroxy-7-methoxy-2,3-dihydro-1H-pyrrolo[2,3-b]quinoline in 150 ml. of methanol, an ether solution containing a stoichiometrically 5 times larger amount of diazomethane is added, and the mixture is allowed to stand at room temperature for 48 hours. Then, the mixture is evaporated to remove the excessive part of diazomethane and solvents under reduced pressure, and the residue is washed with 2% aqueous solution of sodium hydroxide. The residue is recrystallized from methanol whereby 4.1 g. of 1-benzyl-4,7 - dimethoxy - 2,3-dihydro-1H-pyrrolo[2,3-b]quinoline are obtained as colorless prisms melting at 122 to 124° C.

Hydrochloride, M.P. 188° C. (decomp.) (recrystallized from methanol).

EXAMPLE 5

Preparation of the starting compound

A mixture of 2,4-dichloro-3-(β-chloroethyl)quinoline and benzylamine in xylene is heated at 105 to 170° C. in an autoclave for 15 hours. After distilling off the solvent, the residue is extracted with chloroform in an acidic condition whereby 1-benzyl-4-chloro-2,3-dihydro-1H-pyrrolo[2,3-b]quinoline is obtained. M.P. 140 to 141° C. (purified by alumina column chromatography).

Preparation of the objective compound

To a solution of 2.0 g. of potassium in a mixture of 20 ml. of absolute methanol and 20 ml. of monoglyme, 2.0 g. of 1 - benzyl - 4 - chloro-2,3-dihydro-1H-pyrrolo[2,3-b]quinoline are added. After refluxing for 42 hours, the resultant mixture is evaporated to remove solvents under reduced pressure. To the residue, 100 ml. of water are added. To insoluble material is extracted with chloroform. The extract is dried and evaporated to remove the solvent under reduced pressure. The resultant residue is recrystallized from methanol whereby 0.44 g. of 1-benzyl-4-methoxy - 2,3 - dihydro-1H-pyrrolo[2,3-b]quinoline is obtained as colorless needles melting at 139 to 140° C. Hydrochloride, M.P. 199 to 200° C. (decomp.) (recrystallized from methanol).

EXAMPLE 6

Preparation of the starting compound 2,4,7-trichloro-3-(β-chloroethyl)quinoline is suspended in a mixture of 40% aqueous ammonia, ammonium chloride and ethanol, and the suspension is heated at 110 to 120° C. in an autoclave for 7 hours. The resultant crystals are collected by filtration from the cooled reaction mixture and crystallized from a mixture of chloroform and methanol whereby 4,7 - dichloro - 2,3-dihydro-1H-pyrrolo[2,3-b]quinoline is obtained as colorless rhombs melting at 236 to 238° C.

Preparation of the objective compound

To a solution of 2 g. of potassium in a mixture of 20 ml. of absolute methanol and 50 ml. of absolute benzene, 2 g. of 4,7 - dichloro - 2,3 - dihydro-1H-pyrrolo[2,3-b]quinoline are added, and the resultant mixture is refluxed for 36 hours. Then, the mixture is evaporated to remove the solvent under reduced pressure and 100 ml. of water are added thereto. The insoluble material is extracted with chloroform. The extract is dried and evaporated to remove the solvent under reduced pressure. The resultant residue is recrystallized from methanol whereby 0.24 g. of 4-methoxy-7-chloro-2,3-dihydro-1H-pyrrolo[2,3-b]quinoline is obtained as colorless granules melting at 224 to 225° C. Hydrochloride, M.P. 203 to 204° C. (decomp.) (recrystallized from ethanol).

EXAMPLE 7

Preparation of the objective compound

To a solution of 305 g. of potassium hydroxide in 2750 ml. of absolute methanol, 65.2 g. of 4,7-dichloro-2,3-dihydro-1H-pyrrolo[2,3-b]quinoline are added, and the mixture is heated at 120 to 124° C. in an autoclave for 16 hours. The resultant crystals are collected by filtration and added to 150 ml. of 10% hydrochloric acid-methanol. After heating for 30 minutes, the mixture is filtered and the filtrate is evaporated to remove methanol. The residue is recrystallized from methanol whereby 16 g. of 4-methoxy - 7 - chloro - 2,3 - dihydro - 1H-pyrrolo[2,3-b]quinoline hydrochloride are obtained as slightly yellowish needles melting at 202 to 203° C. (decomp.). The filtrate after separation of the crystals from the reaction mixture is concentrated, a large quantity of water is added thereto and the resultant mixture is extracted with chloroform. The chloroform extract is chromatographed on alumina. The resultant free base is converted into the hydrochloride to give 4.0 g. of additional crystals.

EXAMPLE 8

Preparation of the starting compounds

A mixture of 2,4-dichloro-7-methoxy-3-(β-chloroethyl)-quinoline and benzylamine in xylene is heated at 160 to 170° C. in a sealed tube for 16 hours. After removing the solvent, the residue is extracted with chloroform in an acidic condition whereby 1 - benzyl - 4 - chloro-7-methoxy-2,3-dihydro-1H-pyrrolo[2,3-b]quinoline is obtained. M.P. 117 to 119° C. (purified by alumina column chromatography).

Preparation of the objective compound

To a solution of 1.5 g. of potassium in a mixture of 5 ml. of absolute methanol and 50 ml. of absolute benzene, 3 g. of 1 - benzyl - 4 - chloro-7-methoxy-2,3-dihydro-1H-pyrrolo[2,3-b]quinoline are added. After refluxing the mixture for 48 hours, the same procedures are repeated as described in Example 5 whereby 0.66 g. of 1-benzyl-4,7 - dimethoxy-2,3-dihydro-1H-pyrrolo[2,3-b]quinoline is obtained as colorless rhombic prisms melting at 122 to 124° C. Hydrochloride, M.P. 188° C. (decomp.) (recrystallized from methanol).

What is claimed is:

1. A compound of the formula:

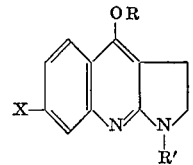

wherein R is a lower alkyl group, R' is a hydrogen atom or a benzyl group and X is a hydrogen atom, a halogen atom or a methoxy group, or its pharmaceutically acceptable acid addition salt.

2. A compound as in claim 1 consisting of 4-methoxy-7-chloro-2,3-dihydro-1H-pyrrolo[2,3-b]quinoline or its pharmaceutically acceptable acid addition salt.

3. A compound as in claim 1 consisting of 1-benzyl-4-methoxy - 7 - chloro - 2,3 - dihydro - 1H-pyrrolo[2,3-b]quinoline or its pharmaceutically acceptable acid addition salt.

4. A compound as in claim 1 consisting of 1-benzyl-4,7-dimethoxy-2,3-dihydro-1H-pyrrolo[2,3-b]quinoline or its pharmaceutically acceptable acid addition salt.

5. A compound as in claim 1 consisting of 1-benzyl-4-methoxy-2,3-dihydro-1H-pyrrolo[2,3-b]quinoline or its pharmaceutically acceptable acid addition salt.

6. A compound as in claim 1 consisting of 4-methoxy-2,3-dihydro-1H-pyrrolo[2,3-b]quinoline or its pharmaceutically acceptable acid addition salt.

References Cited

UNITED STATES PATENTS

| | | | |
|---|---|---|---|
| 1,895,105 | 1/1933 | Rath | 260—288 |
| 2,650,226 | 8/1953 | Andersag | 260—288 |
| 2,691,023 | 10/1954 | Horlein | 260—288 |
| 2,895,956 | 7/1959 | Tuppy | 260—289 |
| 3,287,459 | 11/1966 | Zimmer et al. | 260—289 |

FOREIGN PATENTS

| | | | |
|---|---|---|---|
| 804,514 | 11/1958 | Great Britain | 260—288 |

DONALD G. DAUS, Primary Examiner

U.S. Cl. X.R.

260—283 R, 288 R, 289 R; 424—258